(12) United States Patent
Chung et al.

(10) Patent No.: US 7,588,853 B2
(45) Date of Patent: Sep. 15, 2009

(54) DIRECT METHANOL FUEL CELL HAVING REDUCED CROSSOVER OF METHANOL AND COMPRISING A LAYER OF MATERIAL FOR CONTROLLING THE DIFFUSION RATE OF FUEL

(75) Inventors: Chan-Hwa Chung, Seoul (KR); Woo-Jae Kim, Seoul (KR); Hoo-Gon Choi, Seoul (KR); Young-Kwan Lee, Seoul (KR); Sung-Min Cho, Gyeonggi-do (KR); Jae-Do Nam, Seoul (KR)

(73) Assignee: Sungkyunkwan University Foundation for Corporate Collaboration (KR)

( * ) Notice: Subject to any disclaimer, the term of this patent is extended or adjusted under 35 U.S.C. 154(b) by 165 days.

(21) Appl. No.: 11/394,650

(22) Filed: Mar. 31, 2006

(65) Prior Publication Data

US 2007/0026286 A1    Feb. 1, 2007

(51) Int. Cl.
    *H01M 8/02*    (2006.01)
    *H01M 8/10*    (2006.01)
(52) U.S. Cl. .............................. 429/34; 429/30; 429/33
(58) Field of Classification Search .................. 429/34, 429/30
    See application file for complete search history.

(56) References Cited

U.S. PATENT DOCUMENTS 5,169,383 A * 12/1992 Gyory et al. .................. 604/20
2005/0170224 A1 * 8/2005 Ren et al. ..................... 429/15

* cited by examiner

*Primary Examiner*—Patrick Ryan
*Assistant Examiner*—Angela J. Martin
(74) *Attorney, Agent, or Firm*—Fish & Richardson P.C.

(57) ABSTRACT

The present invention relates to a direct methanol fuel cell having reduced methanol crossover. The fuel cell includes a layer of material for controlling the diffusion rate of fuel.

9 Claims, 6 Drawing Sheets

DIRECT METHANOL FUEL CELL HAVING REDUCED CROSSOVER OF METHANOL AND COMPRISING A LAYER OF MATERIAL FOR CONTROLLING THE DIFFUSION RATE OF FUEL

BACKGROUND OF THE INVENTION

1. Field of the Invention

The present invention relates to a direct methanol fuel cell that comprises a material layer for controlling the diffusion rate of fuel, and thus has reduced methanol crossover. More particularly, it relates to a direct methanol fuel cell exhibiting high power density while using high-concentration methanol fuel, in which a layer of material for controlling the diffusion rate of fuel is interposed between an anode (fuel electrode) and a fuel reservoir.

2. Description of the Prior Art

Fuel cells are cells that convert chemical energy resulting from the oxidation of fuel directly into electrical energy. Unlike general batteries, fuel cells are a power generation system that can continue to make electricity as long as fuel is supplied, without the need for recharging. The fuel cell is a structure in which an electrolyte and two electrodes are stacked in a sandwich configuration. In the fuel cell, when hydrogen and methanol flow toward their electrodes, electricity, heat and water will result.

The fuel cell is a field in which concerned technology institutes and enterprises are very interested as a new electricity generation system. The fuel cell is a kind of direct current power generation system that converts the chemical energy of fuel directly into electrical energy through electrochemical reaction, and has advantages of high power generation efficiency and reduced problems caused by hazardous exhaust gases, such as $NO_x$ and $CO$, compared to other power generation systems, such as diesel power generation systems and gas turbine systems.

The fuel cells can be divided, according to the kind of electrolyte used, into a polymer electrolyte membrane (PEM) type, a phosphoric acid type, a molten carbonate type and a solid oxide type. Among them, the polymer electrolyte membrane-type fuel cell has characteristics of low operating temperature, high efficiency, high current density and output density, short starting time, and quick response to load change, compared to the other types of fuel cells. In addition, since it utilizes the polymer membrane as an electrolyte, it has advantages in that corrosion and the electrolyte do not need to be controlled, it has a simple design, it is easily manufactured, and it has a smaller volume and weight than those of the phosphoric acid-type fuel cell, having the same operating principle.

The polymer electrolyte fuel cells can be divided, according to the type of fuel, into a cell utilizing gas such as hydrogen, and a cell utilizing liquid such as methanol. The polymer electrolyte fuel cell utilizing hydrogen fuel provides an advantage of high energy density, but requires caution in the storage and transport of hydrogen gas. Also, since it requires a separate reformer system for obtaining hydrogen gas, it will have many problems to be solved, when it is applied to a portable cell or a small-sized power generation system.

On the contrary, a direct methanol fuel cell is useful as a portable power generation system, because liquid methanol is injected therein without the need for a separate reformer system. However, the direct methanol fuel cell has shortcomings in that it has a low energy density and requires a large amount of a precious metal catalyst, compared to a hydrogen cell. Nevertheless, considering that the direct methanol fuel cell realizes easy handling of fuel and is inexpensive, it is expected to have very high utility as a small-sized power source.

Lithium-ion cells and lithium polymer cells, which are currently widely used as portable power sources, have energy densities of about 150 Wh/kg and 300 Wh/kg, respectively, whereas the direct methanol fuel cell can achieve an energy density reaching about 1,000 Wh/kg. Furthermore, while the lithium secondary cells require a charge time of about 3 hours, the methanol fuel cell requires a time of only a few seconds to inject aqueous methanol solution fuel therein, and thus has a great advantage in terms of charge time.

The direct methanol fuel cell is in the form of a membrane electrode assembly (MEM) generally comprising catalyst layers (i.e., an anode and a cathode) for oxidizing and reducing fuel, and a polymer electrolyte. All electrochemical reactions consist of two separate reactions that are oxidation at an anode and reduction at a cathode (air electrode), in which the anode and the cathode are separated from each other by an electrolyte. In the direct methanol fuel cell, methanol and water are supplied to the anode, and hydrogen ions generated during the oxidation of methanol move to the cathode along the polymer electrolyte to reduce oxygen supplied to the cathode so as to generate electricity. Outside the two catalyst layers, fuel diffusion layers functioning to effectively supply fuel and as current collectors are disposed.

Despite the above-mentioned various advantages, the direct methanol fuel cell has several problems that must be solved to realize practical application. The methanol crossover phenomenon, one of these problems, is the phenomenon by which methanol crosses over the electrolyte membrane to the cathode without complete oxidation when methanol is injected in a liquid state into the anode, and is the biggest problem to be solved in the direct methanol fuel cell. Due to the methanol crossover phenomenon, the direct methanol fuel cell suffers a fuel loss of more than 20% and a voltage loss of more than 0.1 V.

U.S. Pat. No. 6,866,952 makes an attempt to suppress the crossover of methanol by interposing between two conductive polymer membranes a barrier having micropores smaller than methanol molecules.

Also, U.S. Pat. No. 6,296,964 makes an attempt to uniformly supply methanol into an anode while limiting the crossover of methanol by forming micropores in a gold-coated stainless steel plate and controlling the size and configuration of the micropores.

In addition, methods for suppressing the crossover of methanol by the following means were reported: using a barrier formed by coating tetra(orthoamino-phenyl)porphyrin on the surface of a cathode by electropolymerization (A. Bettelheim, L. Soifer, E. Korin, *Journal of Electroanalytical Chemistry*, 571 (2004) 265-272); and interposing a palladium foil between two sheets of hydrogen ion-conductive Nafion™ 117 polymer membrane so as to transfer only hydrogen ions and suppress the transfer of methanol through the palladium foil (C. Pu, W. Huang, K. L. Ley, E. S. Snotkin, *Journal of Electrochemical Society*, 142 (1995) L119-120).

Korean Patent Laid-Open Publication No. 10-2005-30455 discloses a method of improving the performance of cells by disposing on an anode a fuel diffusion layer having a micropore structure, thus uniformly supplying an aqueous methanol solution and making the discharge of carbon dioxide, produced in the reaction, smooth.

SUMMARY OF THE INVENTION

It is an object of the present invention to provide a direct methanol fuel cell in which the crossover of methanol is suppressed as much as possible.

Another object of the present invention is to provide a direct methanol fuel cell in which the crossover of methanol is fundamentally suppressed even when high-concentration methanol fuel is used and, at the same time, which has high power density, the direct methanol fuel cell comprising, interposed between the anode and fuel reservoir of MEA, a layer of material for controlling the diffusion rate of fuel.

To achieve the above objects, in one aspect, the present invention provides a direct methanol fuel cell comprising an anode, a cathode, current collectors, a polymer electrolyte membrane and a fuel reservoir or cartridge, wherein a layer of material for controlling the diffusion rate of fuel is interposed between the fuel reservoir and the anode, or positioned within the fuel cartridge.

BRIEF DESCRIPTION OF THE DRAWINGS

The above and other objects, features and advantages of the present invention will be more clearly understood from the following detailed description taken in conjunction with the accompanying drawings, in which:

In FIG. 4, the symbols -□- and -○- indicate the anode and cathode of the direct methanol fuel cell according to the present invention, respectively, and the symbols -■- and -●- indicate the anode and cathode of a direct methanol fuel cell not comprising a layer of material for controlling the diffusion rate of fuel.

DETAILED DESCRIPTION OF THE INVENTION

Figure 1:
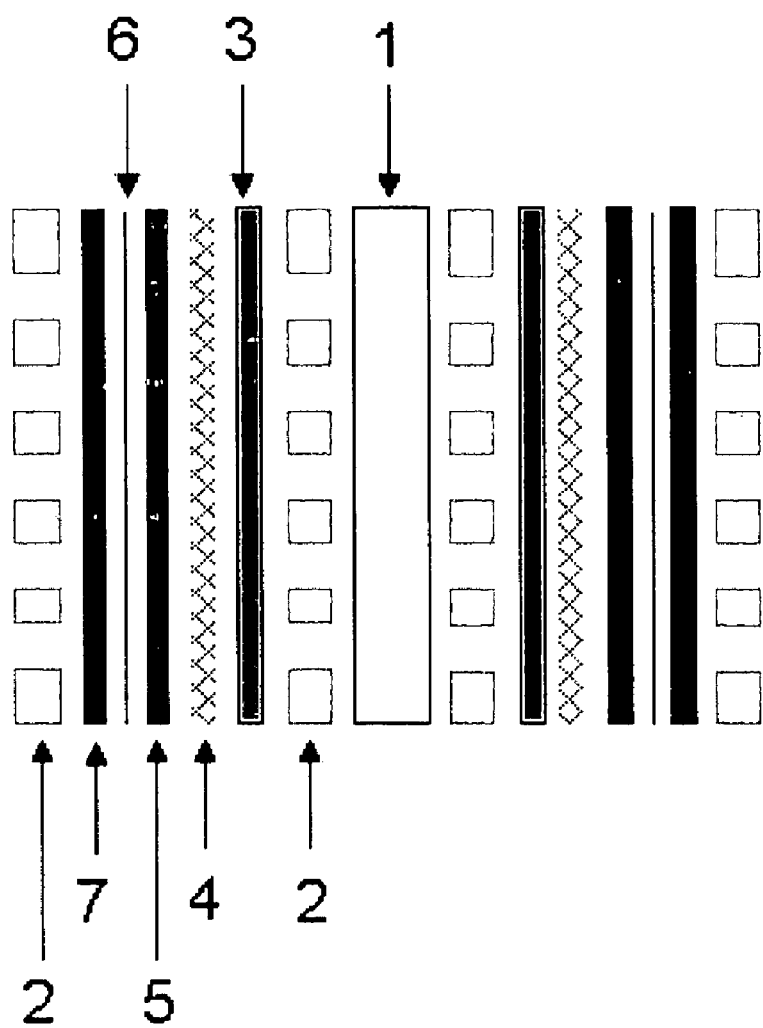
FIG. 1 is a cross-sectional view showing the structure of an embodiment of a direct methanol fuel cell comprising a layer of material for controlling the diffusion rate of fuel according to the present invention.

As used herein, the term "direct methanol fuel cell" refers to a fuel cell which comprises a polymer electrolyte membrane as an electrolyte and in which methanol is oxidized directly in an anode.

As used herein, the phrase "layer of material for controlling the diffusion rate of fuel" refers to a layer that controls the diffusion rate of fuel from a fuel reservoir or cartridge to an anode to fundamentally suppress the crossover of methanol.

The layer of material for controlling the diffusion rate of fuel is placed between the fuel reservoir and anode of the direct methanol fuel cells, and is preferably interposed between a cell support and current collector present between the anode and fuel reservoir of the fuel cell.

The material for controlling the diffusion rate of fuel may be interposed between the anode and fuel reservoir of the fuel cell or positioned within the fuel reservoir (cartridge).

The material for controlling the diffusion rate of fuel may be in the form of a film, gels or powers.

In the present invention, the layer of material for controlling the diffusion rate of fuel can be made of polymers which can easily achieve the desired thickness according to various methods already known in the art.

The polymer which is used to form the layer of material for controlling the diffusion rate of fuel must be capable of maintaining the polymer structure without dissolution in, for example, methanol or aqueous methanol solution, and must be permeable to these solutions.

The structure of the polymer preferably is a branched or network-type structure permeable to methanol or aqueous methanol solution, and more preferably a network-type structure, in order to control the diffusion rate of fuel uniformly.

Examples of the polymer, which can be used as the fuel diffusion rate-controlling material layer in the present invention, include hydrophilic polymers and hydrophilic and hydrophobic polymers. A polymer, used as a membrane in MEA, can also be used to make the layer of material for controlling the diffusion rate of fuel, since it has the above-mentioned properties.

Preferred examples of the polymer for the layer of material for controlling the diffusion rate of fuel according to the present invention include fluorinated polymers, such as perfluorosulfonic acid obtained by copolymerizing a sulfonylfluoride vinylether monomer with tetrafluoroethylene, and partially fluorinated polymers, such as trifluorovinylidene. Other examples usable in the present invention include polymers including ionic groups in aromatic moieties, for example, polyimide polymers prepared by the condensation of dianhydrides with diamines containing a sulfonate group or a carboxylic group, and polyphenylene oxide polymers containing a sulfonate group.

Also, the polymers can be exemplified by hydrophilic polymers containing an acrylate group or its derivative, a sulfonate group or its derivative, or a phosphate group or its derivative. Moreover, as the polymers, hydrophilic crosslinked polymers containing polyacrylic acid and PVA moieties can be also used, in which case these polymers form gels or hydrogels with aqueous methanol solution.

The layer of material for controlling the diffusion rate of fuel, made of the polymer according to the present invention, can be applied in all kinds of direct methanol fuel cells, and can improve problems occurring in the prior art, for example, performance deterioration resulting from an increase in reaction resistance. Also, the use of the above-described polymer as the fuel diffusion rate-controlling material layer provides an advantage in that the layer can be formed to have a small thickness of 200 μm or less in a simple manner.

The diffusion rate of fuel in the catalyst layers will vary depending on the thickness and methanol permeability of the polymer layer. At a polymer layer thickness of 150 to 200 μm, the diffusion rate of fuel can be controlled to be low, as the thickness of the polymer layer increases.

In the direct methanol fuel cell according to the present invention, aqueous methanol solution which is injected or soaked into the fuel reservoir contains 13 to 35 wt % methanol. Considering that the methanol concentration of aqueous methanol solution used in direct methanol fuel cells is generally 6 to 13 wt %, the direct methanol fuel cell according to the present invention can utilize a significantly high methanol concentration of aqueous methanol solution.

The reason why the use of this high-concentration fuel is possible in the inventive direct methanol fuel cell is that the diffusion rate of fuel is rapidly reduced due to the fuel diffusion rate-controlling material layer so as to suppress the crossover of methanol.

The layer of material for controlling the diffusion rate of fuel first absorbs fuel and supplies the fuel to each of the MEAs and to the entire area of each of the anodes, and the supplied fuel is distributed uniformly throughout the anode. Because the diffusion rate-controlling material layer which is used in the present invention has the property to absorb methanol and water, it can supply fuel uniformly over the entire area of a catalyst layer at the anode by absorbing fuel from the bottom of the fuel reservoir and diffusing the fuel up to a region which is not in direct contact with fuel.

Also, unlike the prior methanol fuel cell, in which methanol is injected into an anode through a flow channel, the inventive fuel cell does not require a complex flow channel and a separator, and allows fuel to be uniformly supplied to the reaction catalyst, because the solidified layer of material for controlling the diffusion rate of fuel is placed directly on one side of the anode of MEA in the inventive fuel cell. In addition, because the inventive fuel cell can utilize a high concentration of methanol fuel by virtue of the fuel diffusion rate-controlling material layer, it can use a small amount of fuel for a long period of time, and can contribute to the miniaturization of fuel cells due to a reduction in the volume of a reservoir receiving fuel.

FIG. 1 shows the cross-sectional structure of one embodiment of the direct methanol fuel cell according to the present invention. Referring to FIG. 1, the surface of a fuel diffusion rate-controlling material layer 3 is interposed between the anode 5 and reservoir 1 of MEA while inserting a current collector 4 and a cell support 2 therebetween, and is placed at the left and right sides with respect to the fuel reservoir. The MEA comprises PEM 6 as an electrolyte.

The fuel diffusion rate-controlling material layer 3 is placed at the anode side of MEA in the direct methanol fuel cell, and is preferably placed on the surface of the anode 5 facing the fuel reservoir 1, and is more preferably placed between the current collector 4 and cell support 2 that face the anode.

In the present invention, the cell support 2 can be made of a material that is not electrically conductive and can maintain its strength even when thin. According to the present invention, the cell support 2 is preferably made of epoxy carbon or epoxy glass.

Figure 2:
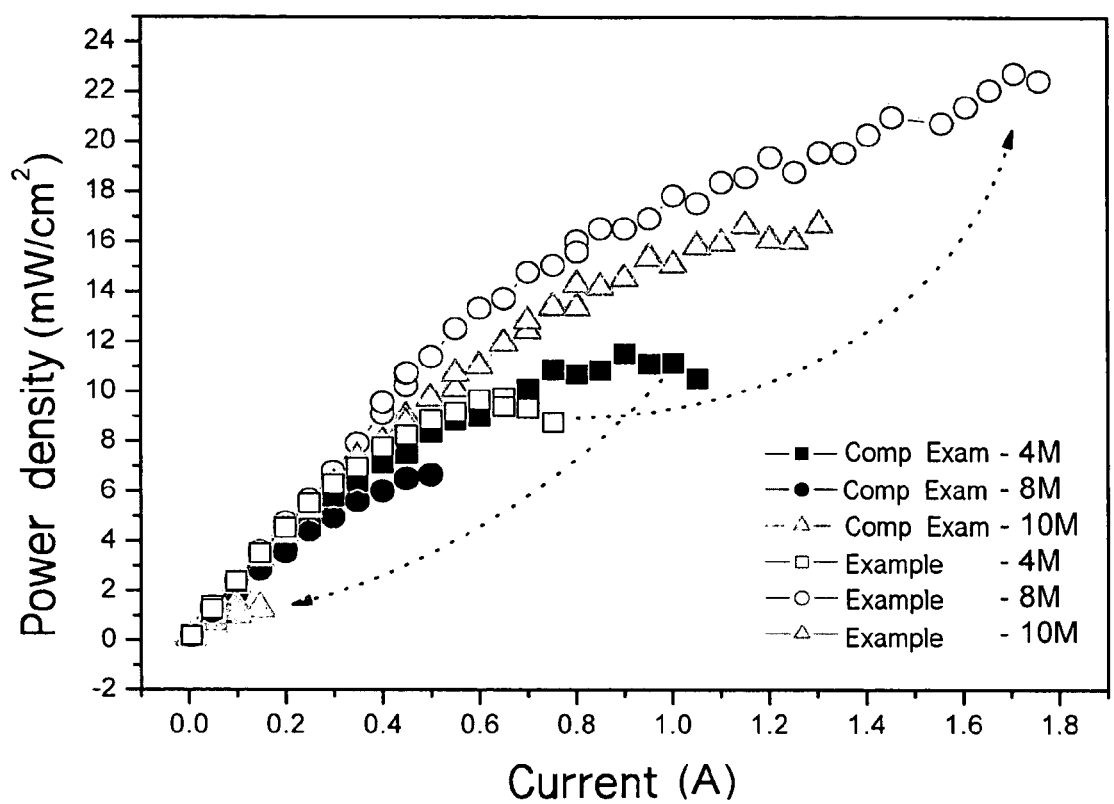
FIG. 2 is a graphic diagram showing power density as a function of electric current in a direct methanol fuel cell manufactured according to the inventive method and in a direct methanol fuel cell not comprising a layer of material for controlling the diffusion rate of fuel.
Figure 3:
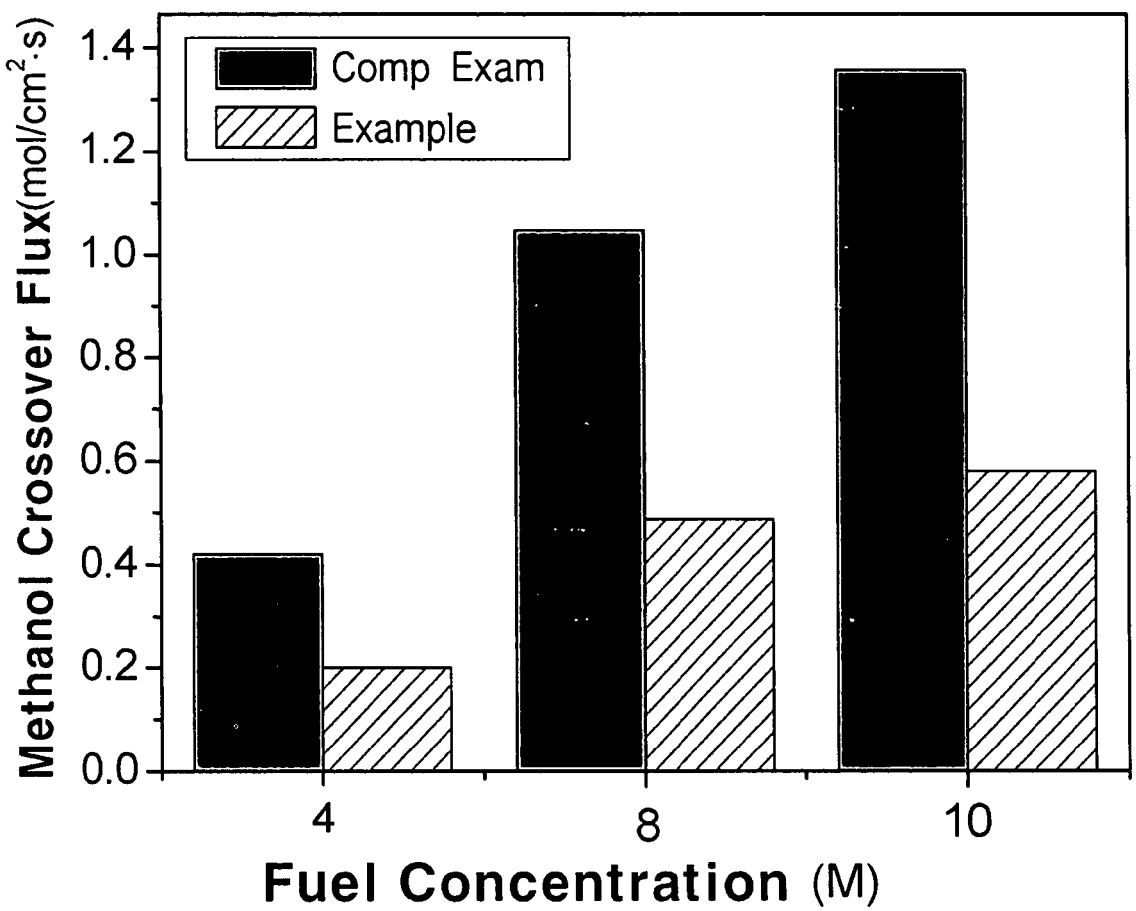
FIG. 3 is a graphic diagram showing the methanol diffusion rates of the direct methanol fuel cell manufactured according to the inventive method and of a direct methanol fuel cell not comprising a layer of material for controlling the diffusion rate of fuel.

Power density as a function of electric current in direct methanol fuel cells is shown in FIG. 2. As shown in FIG. 2, if a given concentration or more of methanol fuel is injected without the fuel diffusion rate-controlling material layer, power density will be remarkably reduced due to the methanol crossover phenomenon. However, it can be seen that the inventive direct methanol fuel cell having the fuel diffusion rate-controlling material layer inserted therein shows a higher power density even when a high methanol concentration of aqueous methanol solution is used as fuel. This result demonstrates the excellent characteristic of the inventive direct methanol fuel cell, in which the excessive injection of fuel into the anode is suppressed due to diffusion resistance caused by the fuel diffusion rate-controlling material layer so as to reduce the crossover of methanol, even when a high concentration of methanol is injected. FIG. 3 is a graphic diagram showing the methanol diffusion rates of the direct methanol fuel cell including the fuel diffusion rate-controlling material layer and of a direct methanol fuel cell having no fuel diffusion rate-controlling material layer. As shown in FIG. 3, the layer of material for controlling the diffusion rate of fuel can reduce the diffusion rate of methanol by at least 50% in the same methanol concentration of aqueous methanol solution.

The effect of the fuel diffusion rate-controlling material layer on the suppression of the methanol crossover phenomenon can be examined by measuring open cell voltage (OCV).

OCV refers to the voltage value of a cell in the absence of electron load, and a reduction in OCV has a correlation with the crossover of methanol. Specifically, if methanol fuel concentration increases, the more amount of methanol will be transported to cathode side by methanol crossover phenomenon and the oxidation of methanol will also occur in the cathode, which results a reduction in the potential difference of the cell and therefore a reduction in voltage. As can be seen in Table 1 below, if the fuel diffusion rate-controlling material layer is not used, the OCV value will suddenly decrease when the methanol fuel concentration is increased, whereas, if the fuel diffusion rate-controlling material layer is used, the OCV value will not rapidly decrease even upon a concentration of 10 M. This is because the methanol crossover phenomenon is suppressed due to the fuel diffusion rate-controlling material layer.

TABLE 1

| | OCV value [Volt] of the fuel cell without using fuel diffusion rate-controlling material | OCV value [Volt] of the fuel cell with using fuel diffusion rate-controlling material |
|---|---|---|
| 4 M | 0.69 | 0.70 |
| 8 M | 0.61 | 0.64 |
| 10 M | 0.41 | 0.62 |

Figure 4:
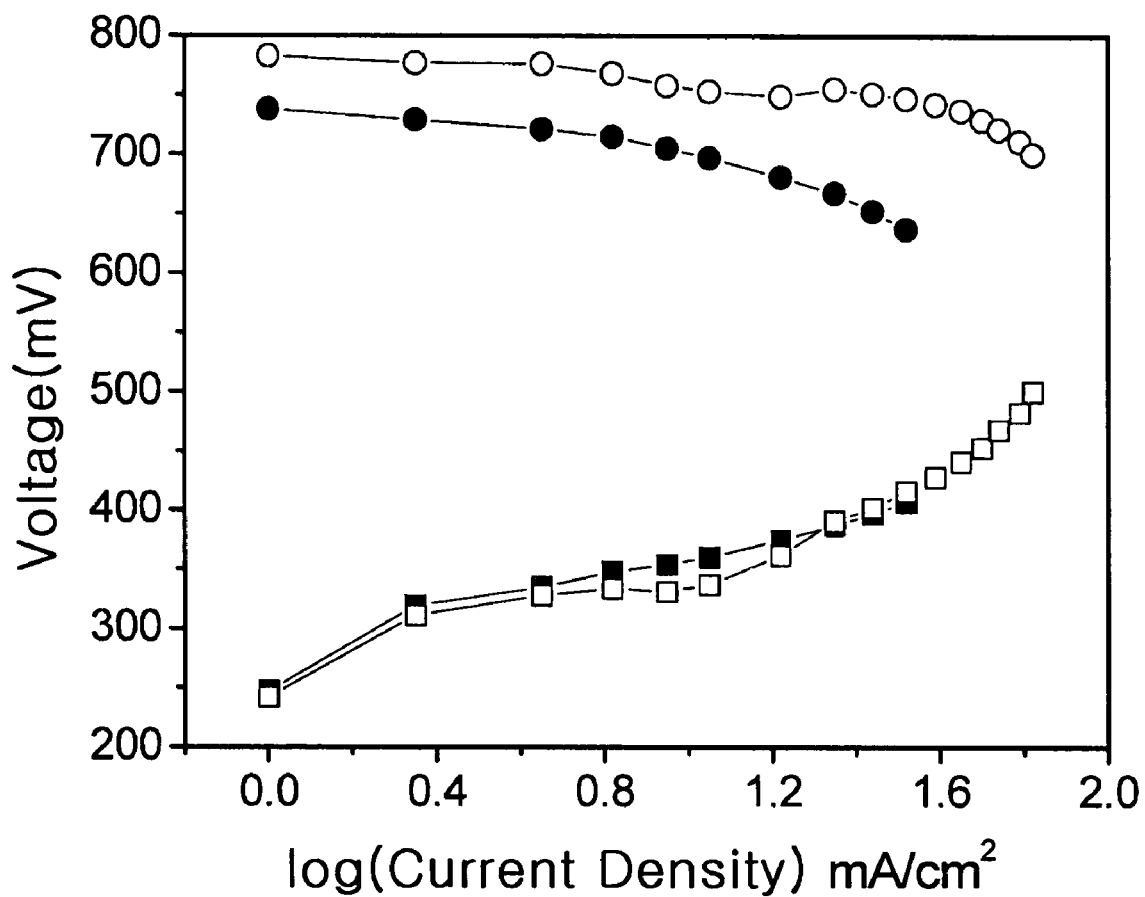
FIG. 4 is a graphic diagram showing the results of three-electrode experiments for the direct methanol fuel cell manufactured according to the inventive method and for a direct methanol fuel cell not comprising a layer of material for controlling the diffusion rate of fuel.

In a three-electrode test where the potential of an anode and a cathode to a reference electrode is measured, the methanol fuel cell comprising the fuel diffusion rate-controlling material layer according to the present invention showed a higher cathode potential than the case comprising no fuel diffusion rate-controlling material layer. The reason why the cathode potential of the inventive fuel cell increases in under the same conditions is that the crossover of methanol was substantially reduced due to the fuel diffusion rate-controlling material layer. FIG. 4 is a graphic diagram showing the results of three-electrode experiments for the inventive direct methanol fuel cell and a direct methanol fuel cell not comprising a layer of material for controlling the diffusion rate of fuel.

In the direct methanol fuel cell according to the present invention, it is possible to control the diffusion rate of fuel using the fuel diffusion rate-controlling material layer. Thus, injected methanol fuel can react in the catalyst layer in the highest possible amount, and as a result, the amount of unreacted methanol that causes the methanol crossover phenomenon can be minimized, thereby increasing energy density and output density. Also, since a high methanol concentration of aqueous methanol fuel is used in the inventive fuel cell, the volume of the fuel reservoir can be reduced, thus making it easy to miniaturize the fuel cell.

In addition, the uniformity of fuel supply to each MFA and the uniformity of fuel supply throughout the entire area of each anode are improved, thus making more efficient operation of the fuel cell possible.

Hereinafter, the present invention will be described in further detail with reference to examples. It is to be understood, however, that these examples are for illustrative purposes only and are not to be construed to limit the scope of the present invention.

EXAMPLE 1

As a catalyst for an anode, a commercially available catalyst (Johnson Matthey Co.) Pt—Ru (mole ratio of 1:1) was used, and as a catalyst for a cathode, Pt black (Johnson Matthey) was used.

To the anode, about 15 wt %, based on the weight of the catalyst, of Nafion solution (5 wt % solid content) was added, and to the cathode, 10 wt % of Nafion solution (5 wt % solid content) was added. Then, some quantity of Teflon emulsion (Dupont Co., Teflon T-30) was added thereto, thus preparing catalyst slurries. Next, the slurries were sprayed on carbon paper for the cathode, which had been treated with a Teflon water repellent in order to remove water generated after reaction, and sprayed on carbon paper for the anode, which had not been treated with a Teflon water repellent in order to effectively supply methanol, respectively, thereby preparing electrodes each containing about of 5 mg/cm$^2$ of the catalyst.

The catalyst layers formed on carbon paper were naturally dried, and then 1 mg/cm$^2$ of Nafion® solution was applied thinly on each of the catalyst layers in order to reduce interfacial contact resistance and to increase catalyst availability. The electrodes thus prepared were pressed against each other at 135° C. and a pressure of 500 psi/cm$^2$ for about 3 minutes while inserting a Nafion® electrolyte therebetween, thereby manufacturing a MEA.

To the surface of MEA facing the anode, a perfluorosulfonate polymer was attached as a fuel diffusion rate-controlling material layer that can transfer aqueous methanol solution from a fuel reservoir to the anode. The cathode was exposed to air so as to permit oxygen in air to freely access the cathode.

As a cell support, 0.1-cm thick epoxy carbon was used and a fuel reservoir was made of 0.5-cm thick epoxy glass. The manufactured fuel cell had a size of 8.1 cm width×7.4 cm length×1 cm thickness, and two sheets of MEA having a size of 3 cm×6 cm were placed at each of both sides of the fuel reservoir (the total area of MEA was 72 cm$^2$).

Electron load was connected to the fuel cells manufactured as described above and each of 4 M, 8 M and 10 M methanol aqueous solutions was then injected into the fuel reservoir. Power density as a function of electric current in the fuel cells was measured. The measurement results are shown in FIG. 2.

COMPARATIVE EXAMPLE

Direct methanol fuel cells were manufactured using MEA fabricated in the same manner as in Example 1, except that the layer of material for controlling the diffusion rate of fuel was not used. 4 M, 8 M and 10 M methanol aqueous solutions were injected into the fuel reservoirs of the manufactured fuel cells, and power density as a function of electric current was measured. The measurement results are shown in FIG. 2.

As can be seen in FIG. 2, the power density measured when 4 M (13 wt %) methanol aqueous solution has been injected into the fuel cell of Comparative Example was 11 mW/cm$^2$. At a methanol concentration of 8 M (32 wt %), it can be seen that the power output was decreased to about 6.7 mW/cm$^2$, which is a typical result of the methanol crossover phenomenon. At a methanol concentration of 10 M (35 wt %), the methanol crossover phenomenon was more pronounced when the power density was more rapidly decreased to about 1.3 mW/cm$^2$.

However, in the case of Example 1, it can be seen that, even though a high methanol concentration (8 M or more) of methanol aqueous solution was used, the fuel cell showed a higher power density (22.7 mW/cm$^2$), compared to Comparative Example. This improvement in performance was because the fuel diffusion rate-controlling material layer has the property of controlling the diffusion rate of methanol supplied from the fuel reservoir.

EXAMPLE 2

In order to examine the change in the diffusion rate of methanol according to the presence or absence of the fuel diffusion rate-controlling material layer, a methanol permeation test was carried out. For this purpose, the fuel diffusion rate-controlling material layer was placed between the fuel reservoir and a container having hydrogen ion-conductive polymer membrane Nafion® 115 attached thereon, and pure water was injected into the container, and each of 4 M, 8 M and 10 M methanol fuel was injected into the reservoir. Then, the increase in methanol concentration in the container over time per unit area of the Nafion electrolyte membrane was observed using a refractive index detector, thus measuring the permeation rate of methanol. The measurements for the direct methanol fuel cell containing the same diffusion rate-controlling material layer as in Example and the direct methanol fuel cell containing no diffusion rate-controlling material layer, as in Comparative Example, are shown in FIG. 3.

As can be seen in FIG. 3, at all the methanol fuel concentrations, the use of the fuel diffusion rate-controlling material layer provided a reduction of at least 50% in the diffusion rate of methanol.

EXAMPLE 3

Three-electrode experiments for the direct methanol fuel cell containing the fuel diffusion rate-controlling material layer and the direct methanol fuel cell not containing the material layer were carried out using 8M methanol aqueous solution as fuel.

As a reference electrode, 0.5 M sulfuric acid solution was used and measurement was made for a solid electrolyte membrane (PEM) interposed between the anode and the cathode. The results are shown in FIG. 4.

As shown in FIG. 4, the potential at the anode was similar between the two fuel cells, but the potential at the cathode was significantly higher in the fuel cell containing the fuel diffusion rate-controlling material than in the fuel cell not containing the material layer.

The increase in the cathode potential is believed to be because the methanol crossover phenomenon was suppressed due to the fuel diffusion rate-controlling material layer, and this result supports the fact that the reduction in the crossover of methanol substantially contributes to the increase in the cathode potential.

EXAMPLE 4

To the surface of MEA at the side of the anode, a perfluorosulfonate polymer as the fuel diffusion rate-controlling material layer capable of transferring methanol solution from the fuel reservoir to the anode was attached to have thicknesses of 150 μm and 170 μm, and two direct methanol fuel cells using 8 M methanol solution as fuel were manufactured. Power density as a function of electric current in each of the fuel cells was measured, and the results are graphically shown in FIG. 5.

Figure 5:
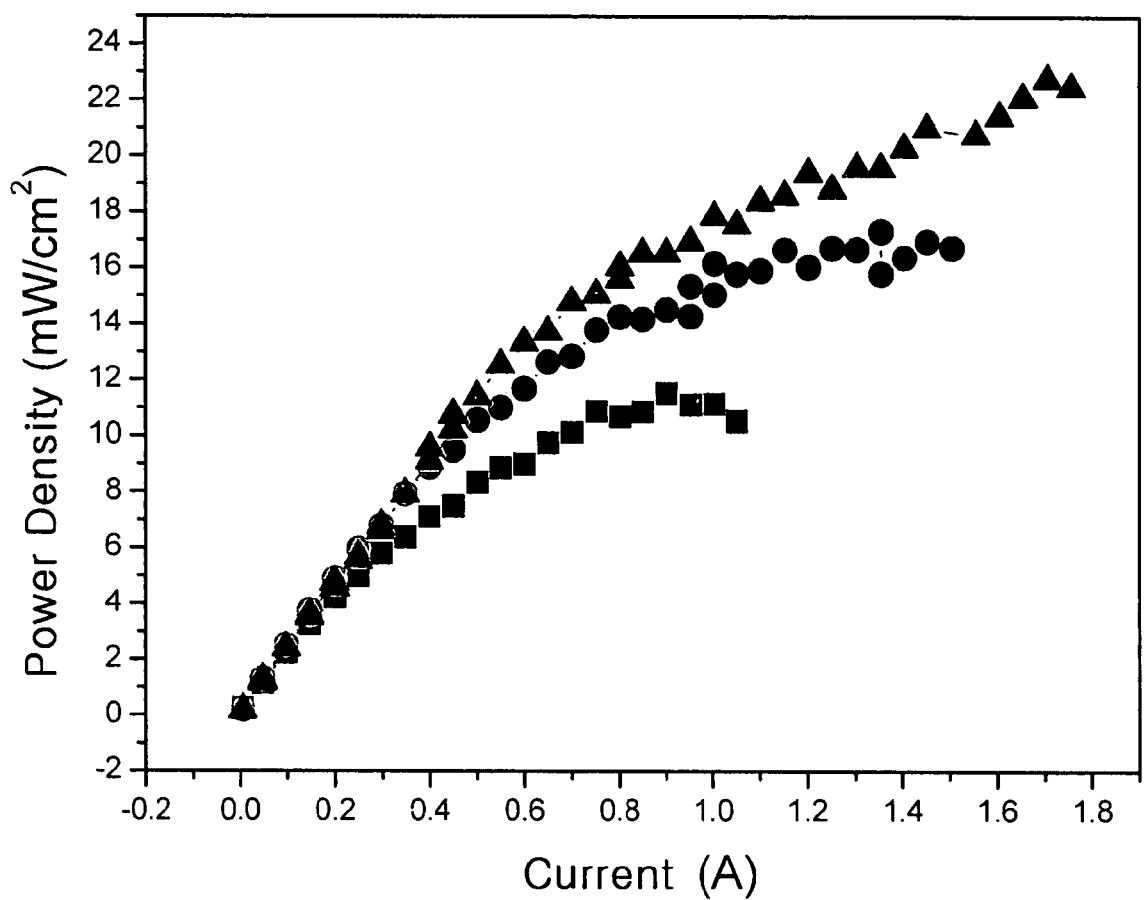
FIG. 5 is a graphic diagram showing current density as a function of electric current in the inventive direct methanol fuel cells that use 8 M methanol aqueous solution as fuel and have different thicknesses of layers for material for controlling the diffusion rate of fuel (-●-: 150 μm thickness, and -▲-: 170 μm thickness), and in a direct methanol fuel cell not having a layer of material for controlling the diffusion rate of fuel (4 M methanol aqueous solution; -■-).

As shown in FIG. 5, the fuel cell having a 150 μm thickness of the fuel diffusion rate-controlling material layer showed a higher power density than that of the fuel cell not containing the material layer, and the power density was further increased at a thickness of 170 μm of the material layer.

EXAMPLE 5

To determine the usefulness as a cell for portable phones, the operation of a portable phone was tested using the fuel cell comprising the fuel diffusion rate-controlling material. As a fuel diffusion rate-controlling material, the hydrogels of hydrophilic crosslinked polymer containing polyacrylic acid and PVA moieties were packed in fuel reservoir (cartridge), and methanol was soaked to these hydrogel powders.

To obtain power necessary for the operation of the portable phone, two sets of fuel cells were used (total area: 144 $cm^2$; total power: 22.7 $mW/cm^2 \times 144$ $cm^2$=3.26 W; DC/DC converter efficiency: 80%; effective power usable for the actual operation of the portable phone: 3.26×0.8=2.62 W). Also, a DC/DC converter that could correct generated voltage to voltage suitable for the operation of the portable phone was used.

Figure 6:
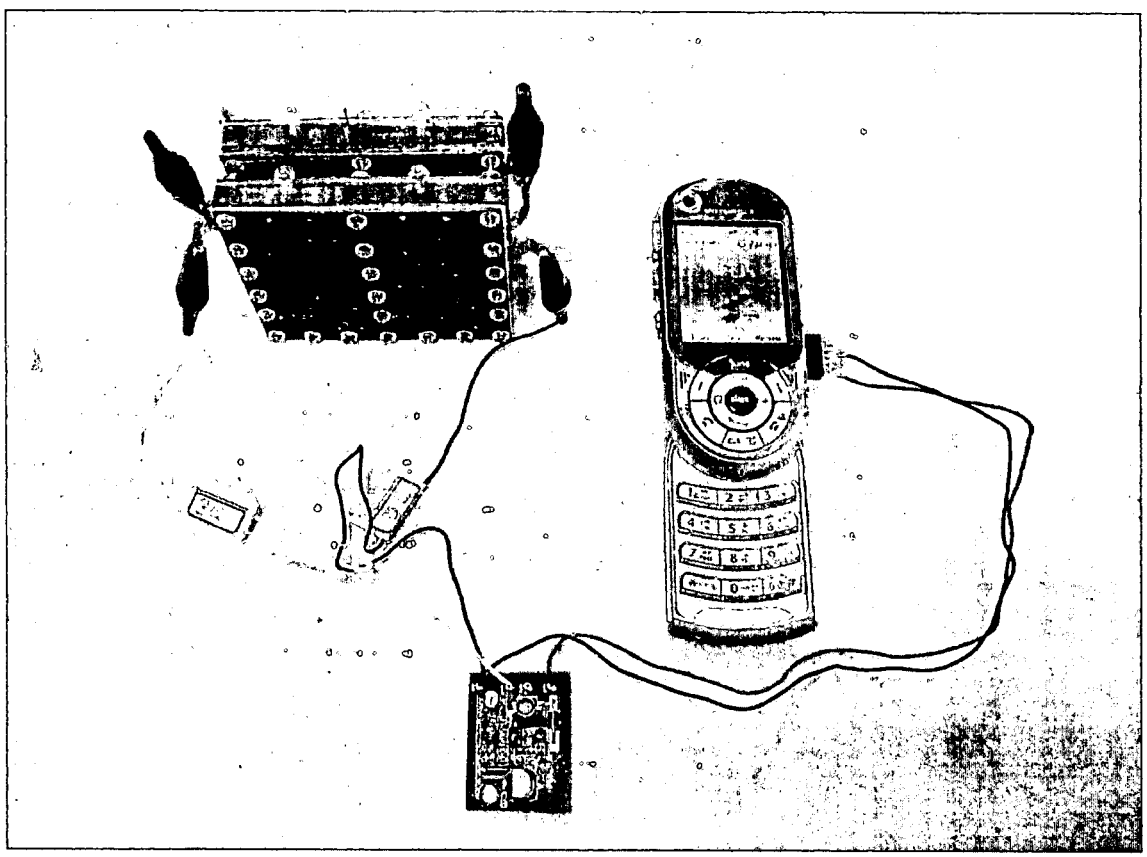
FIG. 6 is a photograph showing a portable phone operated using the direct methanol fuel cell manufactured according to the inventive method.

As shown in the photograph of FIG. 6, the operation of the portable phone was possible using the fuel cell, and the portable phone could be operated continuously for about 1 hour with only a single fuel injection (18 ml) at the highest power consumption mode of 2.4 W.

As described above, the direct methanol fuel cell comprising the fuel diffusion rate-controlling material layer according to the present invention can reduce the diffusion rate of fuel while using high-concentration fuel. Thus, the amount of unreacted methanol on the anode catalyst layer can be minimized, so that the methanol crossover phenomenon can be fundamentally suppressed, thereby improving energy density and output density. In addition, a high methanol concentration of aqueous methanol fuel can be used, thus making the miniaturization of the fuel cell possible.

Thus, according to the present invention, the performance of all kinds of direct methanol fuel cells can be improved and the fuel cells can be miniaturized, so that these can be used as electric power sources for small-sized portable electronic products, such as portable phones, PDAs, and notebook computers.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A direct methanol fuel cell comprising an anode, a cathode, current collectors, a polymer electrolyte membrane, and a fuel reservoir or cartridge, in which a layer of material for controlling the fuel diffusion rate of methanol is interposed between the fuel reservoir and the anode or positioned within the fuel cartridge, the material for controlling the fuel diffusion rate of methanol comprising a polymer which is permeable to methanol or aqueous methanol solution, is insoluble in methanol, and is a type that can maintain a polymer structure thereof, wherein an aqueous methanol solution which is injected or soaked into the fuel reservoir contains 13 to 35 wt % of methanol.

2. The direct methanol fuel cell of claim 1, wherein the material for controlling the fuel diffusion rate is interposed between the anode and fuel reservoir of the fuel cell or positioned within the fuel reservoir or cartridge.

3. The direct methanol fuel cell of claim 1, wherein the layer of material for controlling the diffusion rate of methanol supplies fuel uniformly to each of MEAs and to the entire area of each of the anodes.

4. The direct methanol fuel cell of claim 1, wherein the material for controlling the diffusion rate of methanol is in the form of a film, gels or powders.

5. The direct methanol fuel cell of claim 1, wherein the type that can maintain the polymer structure is a branched or network-type structure.

6. The direct methanol fuel cell of claim 1, wherein the polymer is a hydrophilic polymer or a copolymer having hydrophilic and hydrophobic moieties.

7. The direct methanol fuel cell of claim 1, wherein the polymer is at least one polymer or a mixture of two or more selected from the group consisting of: fluorinated polymers, including perfluorosulfonate prepared by copolymerizing a sulfonylfluoride vinylether monomer with tetrafluoroethylene; partially fluorinated polymers, including trifluorovinylidene; polyimide polymers prepared by the condensation of diamine containing a sulfonate group or a carboxylic group with dihydroxyanhydride; and polyphenylene oxide polymers containing a sulfonate group.

8. The direct methanol fuel cell of claim 1, wherein the polymer is a hydrophilic polymer containing an acrylic acid or its derivative, a sulfonate group or its derivative, or a phosphate group or its derivative.

9. The direct methanol fuel cell of claim 1, wherein the polymer is a hydrophilic crosslinked polymer containing polyacrylic acid and PVA moieties.

* * * * *

UNITED STATES PATENT AND TRADEMARK OFFICE
CERTIFICATE OF CORRECTION

PATENT NO.       : 7,588,853 B2                                    Page 1 of 1
APPLICATION NO.  : 11/394650
DATED            : September 15, 2009
INVENTOR(S)      : Chung et al.

It is certified that error appears in the above-identified patent and that said Letters Patent is hereby corrected as shown below:

Please add the following to the front page of the patent:

--(30)     Foreign Application Priority Data

Jul. 29, 2005           (KR) ..................... 10-2005-0069867--

Signed and Sealed this

Twenty-third Day of February, 2010

David J. Kappos
*Director of the United States Patent and Trademark Office*